United States Patent [19]
McIlwain et al.

[11] 3,850,091
[45] Nov. 26, 1974

[54] NEEDLE SLOT BAFFLES FOR BALERS EMPLOYING AUTOMATIC TYING DEVICES

[75] Inventors: Irwin D. McIlwain, Lancaster, Pa.; Thomas B. Moody, North Battleford, Saskatchewan, Canada

[73] Assignee: Sperry Rand Corporation, New Holland, Pa.

[22] Filed: Feb. 16, 1973

[21] Appl. No.: 333,071

[52] U.S. Cl. .................................. 100/19 R, 100/31
[51] Int. Cl. ........................................... B65b 13/28
[58] Field of Search ...................... 100/19 R, 29–33; 56/448

[56] References Cited
UNITED STATES PATENTS

| | | | |
|---|---|---|---|
| 947,039 | 1/1910 | Hart | 100/19 R |
| 2,655,861 | 10/1953 | Lilenbee | 100/19 R |
| 3,084,619 | 4/1963 | Tate | 100/19 R |

*Primary Examiner*—Billy J. Wilhite
*Attorney, Agent, or Firm*—Louis J. Virelli, Jr.; Frank A. Seemar; John R. Flanagan

[57] ABSTRACT

A baffle plate adapted to be placed on balers utilizing a tying apparatus to securely fasten the bales after they have been formed. Such baffles are disposed in the immediate vicinity of the respective tying mechanism directly above the openings in the top of the bale case, so as to prevent any material from entering and interfering with the operation of the tying mechanisms.

8 Claims, 7 Drawing Figures

NEEDLE SLOT BAFFLES FOR BALERS EMPLOYING AUTOMATIC TYING DEVICES

BACKGROUND OF THE INVENTION

The present invention relates generally to agricultural machinery, and more particularly to balers which are provided with means for automatically binding and tying bales of hay and the like.

The usual operation of a baler includes gathering the crop in the fields after it has been previously cut, moving said crop into a generally side mounted bale case, and then compressing the material in said case, thereby forming a rectilinear block of material commonly referred to as a bale. The means for gathering and moving the crop into the side mounted chamber, as well as the means for compressing the crop into the desired shape has been known and utilized for many years. Also the method for binding and tying the material, after it has been formed in a bale, is one that has been used for some time. The tying operation performed by a baler is one that although developed and first used many years ago is one in which imperfections still exist.

The typing mechanism used on today's balers generally consists of two or three knotting or twisting devices mounted above the bale case, a clamping structure which holds one end of the binding material during formation of the bales and needles which move in front of the formed bale and through the said bale case on which the binding material runs. During formation of the bale the needles are kept below the floor of the case so as not to interfere with the compacting motion of the reciprocating plunger. Upon actuation, the needles proceed through the bale case until they project through the openings on the top of the case. It is after the needles have projected through these openings that they come in contact with their respective knotting or twisting mechanisms.

The tying mechanisms used on a baler are designed generally to be used with either wire or twine as the binding material. In a wire tying mechanism the wire proceeds around the bale during the compression stage, until the yoke of the needles is activated, at which time, they proceed with the wire in front of the formed bale until they reach the clamping structure positioned on top of the bale case. After reaching this position, the wire twister twists together the wire initially held in the clamp to the wire on the needles. The twine tying mechanism operates essentially as does the wire tie in that twine is initially held in a clamping structure, above the bale case, and leads through the openings in the top of the bale case through the tip of the needles lying directly beneath the floor of the bale case. As straw is compacted in the bale case, it forces the twine around the bundle of compacted straw. The needles when actuated move through the bale case until they reach the knotting device at which time they place the twine in the clamping device so that the twine now completely encompasses the compacted straw. With the two twine ends in the retainer disc, the twine is now lying across the knotter bill hook. This bill hook then is actuated and moves in a circular path forming a knot to tie the two ends of the twine together.

Until recently, balers employing either of the tying mechanisms as set forth above have encountered the problem of stalky material being forced through the bale case into the vicinity of the knotter or twister. This material when lodged above the bale case creates separate and distinct problems for each type tying device.

In the wire tying mechanism, if this material proceeds above the bale case, it will generally contact the tying mechanism in the vicinity of the wire twister. Stalky material in this area of the tying mechanism may become entangled with the ends of the wire during the twisting operation. It is this entanglement of the stalky crop material with the wires during the twisting operation which causes an incomplete twist to be effectuated. In a twine tie mechanism stalky crop material moved in the vicinity of the twine knotter is primarily responsible for preventing improper alignment of the twine over the bill hook. This improper alignment will cause an incomplete knotting operation to occur. These difficulties caused by stalky material placed in the vicinity of the respective tying mechanisms pose for the farmer the frustrating problem of recently formed bales breaking apart upon movement from the bale case.

In the past, various designs have been proposed to eliminate the stalky crop material in the bale case from being transported into the immediate vicinity of the respective tying mechanisms. One means previously employed to solve this recurring problem is shown in the Tate U.S. Pat. No. 3,084,619, issued Apr. 9, 1963. This invention while proving satisfactory in keeping materials in the bale case during the compression cycle, has not solved the problem of the tying needles transporting material from the bale case into the tying mechanism. The reason for this ineffectiveness is that while Tate's "cover plates" remain over the openings in the top of the bale case, during compression of the material; due to their axial connection, they move away from the openings as the needles proceed through the bale case. This synchronized movement of the "cover plates" does not prevent stalky crops from being pushed by the needles through the openings and into the tying mechanisms.

SUMMARY OF THE INVENTION

It is an object of the present invention to provide a device which will effectively eliminate stalky materials from lodging in the tying mechanism utilized on balers.

More particularly, it is an object of the present invention to provide a stationary device to maintain materials within the bale case during the tying cycle of a crop baler.

It is still a further object of the present invention to provide a stationary means secured to the top of the bale case and which prevents material from being forced into the tying mechanism during the compression stage of the baling operation.

It is another object of this invention to provide a means by which the wire or twine on the tying needles can more directly be guided to the twister hook or bill hook in the tying mechanisms.

Another object of the present invention is to provide means on which components of the respective type tying mechanisms can be mounted.

A still further object of the present invention is to provide means for shearing stalks which may be draped over the tying needles when they exit the bale case.

These and further objects and advantages of this invention will be apparent to those skilled in the art after a consideration of the following detailed description,

DESCRIPTION OF THE PREFERRED EMBODIMENTS

Figure 1:
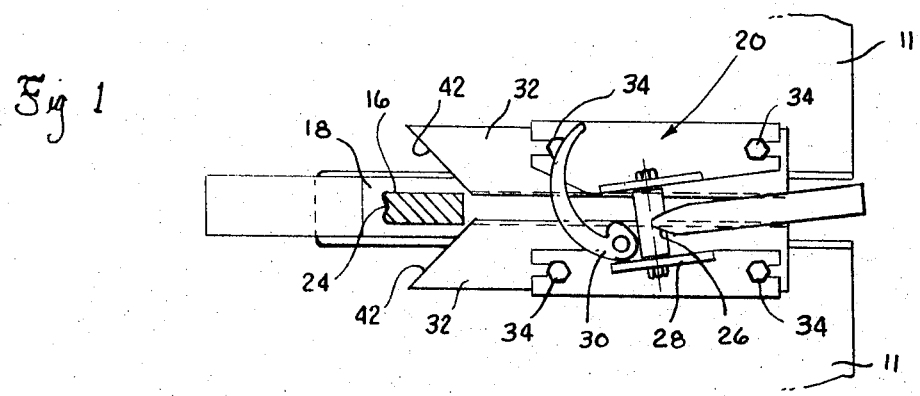
FIG. 1 is a plan view of a portion of a conventional wire tying mechanism and the stationary baffles of this invention.

The reference numeral 8 indicates generally a baler comprised of a main frame 17, supported by wheels 15 and 19 respectively, a longitudinally extending bale case 10, and a reciprocating plunger 13 mounted within said bale case. Reference numeral 10 indicates a bale case on which a wire twister or twine knotter is mounted and upon which the needle slot baffles of this invention are fixed. The bale case 10 generally consists of two side walls 12, a floor 14, and a top portion 11. Included in the top 11 of said bale case are two openings 18. These openings are provided to allow movement of the needles 16 to proceed through the bale case to the tying mechanism 20 or 21 mounted on the top of the bale case. Also, included in the bale case 10, is a reciprocating plunger 13 which operates in a conventional manner to compress crop materials into the desired shape.

FIGS. 1–6 set forth the combination of a binding material tying mechanism and a bale case. The tying mechanisms 20 or 21 consists of several basic elements. These elements include in both the wire tie, FIGS. 1–3, and the twine tie, FIGS. 4–6, mechanisms; needles 16 on which the respective binding material is secured; a clamping device 26, FIG. 2, and 40, FIG. 5, which holds one end of the binding material 22 or 23 in a fixed position during the compression and formation stage of the baling cycle; and finally, some type of a securing device 30, FIG. 2, and 38, FIG. 5, used to fasten the respective ends of the binding material around the formed bale. The combination of devices previously set forth are found in both types of tying mechanisms and interact in essentially the same manner. After material is placed in the bale case 10, the reciprocating plunger forces the material along the length of the bale case 10 until the bale is formed. Once the bale has reached its desired length, the needles 16, which were initially positioned below the floor 14 of the bale case, are activated and move through the bale case 10, through the needle slot openings 18, located in the top 11 of the bale case, to finally contact the clamping device 26 or 40 in the respective tying mechanisms situated directly above the needle slot openings 18. Initially held in clamps 26 and 40, respectively, was one end of the binding material which when the needles 16 are activated has been forced around the compressed bale. On the needles 16 the other end of the binding material is fastened and is positioned, after movement through the bale case, next to the initially secured end held in the respective clamps. Once the two ends of the binding material are both within the clamping devices 26 or 40, the twisting or knotting mechanism incorporated in the tying devices secure the ends of the binding material to complete the binding operation.

In examining individually the respective type tying mechanisms, it should be noted that details of the respective tying mechanism have not or will not be set forth in this application for a patent because of numerous prior disclosures on the device in question.

Figure 2:
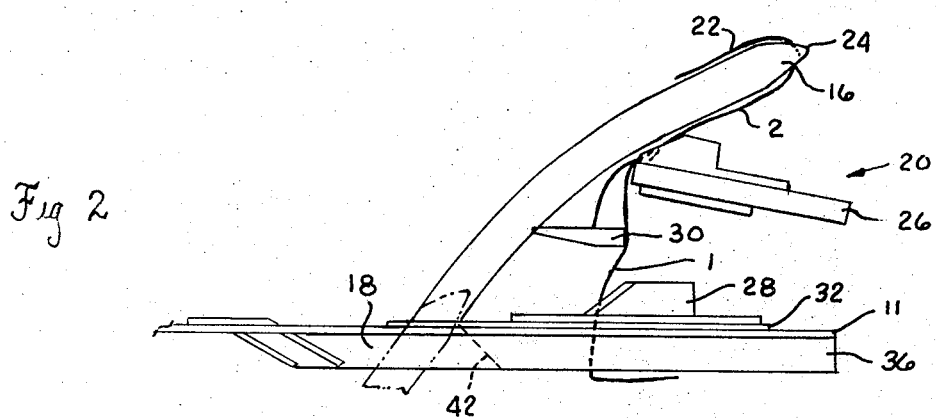
FIG. 2 is a side view of the baffles of the present invention and portions of a conventional wire tying mechanism.
Figure 3:
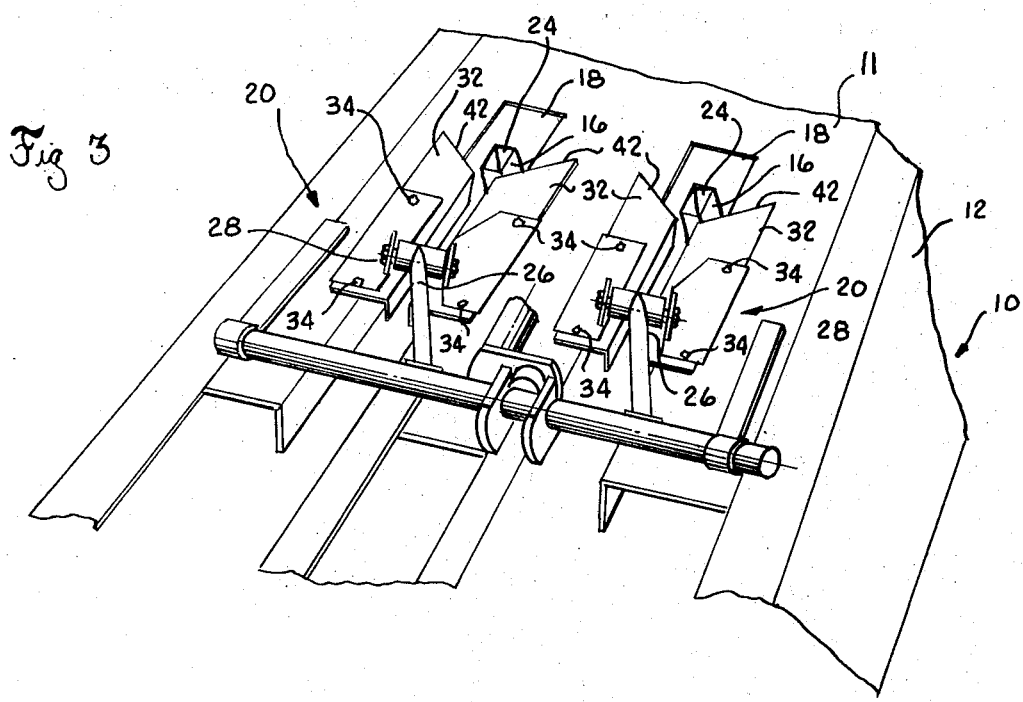
FIG. 3 is a right-rear perspective view of the assembly shown in FIG. 1, showing in more detail how the present invention and the tying device are interconnected.

FIGS. 1–3 show the general configuration and operation of a wire type tying mechanism 20. The compression and forming stage of the baling cycle will be precisely the same as previously described. Prior to the compression of the crop material in the bale case, one end of the wire 22 is retained in the clamp and guard assembly 26 situated directly above the needle slot openings 18 located in the top 11 of the bale case. The other end of wire 22 runs along the needles 16 positioned below the floor 14 of the bale case. These connections of the wire, both above and below the bale case, cause the wire 22 to be extended across the center of the bale case 10. Therefore, upon compression of the crop material in the bale case, the wire 22 will be formed around the said bale as it is being formed. Once the bale has reached its desired length, the needles 16 are actuated and move through the floor 14 of the bale case, the bale case itself 10, and finally proceed through the needle slot openings 18 located at the top 11 of the bale case to the tying mechanism 20. The wire transported through the chamber which is connected to the tying needles 16 at 24 is referred to as end 2 of wire 22, while the wire initially held by the clamp and guard assembly 26 during the formation of the bale is referred to as end 1 of wire 22. As shown in FIG. 2, end 1 of wire 22 proceeds from the clamp 26 around and below the unloading roller racks 28 around the formed bale to its connection 24 on the tying needles 16. When needles 16 proceed to their position in the clamp and guard assembly 26, the bale in the chamber is completely encompassed by the wire 22. When ends 1 and 2 of the wire 22 are positioned in the clamp and guard assembly 26, the wire twister 30 moves in a circular manner twisting the ends of the wire into contact with each other. Once this twisting operation is complete, the bale is completely encircled by the wire. If when ends 1 and 2 of wire 22 are brought up in front of the formed bale stalks are transported along with the needles 16, the stalks may interfere with either the operation of the clamp and guard assembly 26 or of the wire twister 30 of the tying mechanism.

When this stalky crop material is transported by the needles 16 through the needle slot openings 18 in the top 11 of the bale case, it may prevent the clamp and guard assembly 26 from securely retaining end 2 of wire 22 during the twisting operation. If end 2 is loosely held during the twisting operation, the wire twister 30 will be unable to securely twist the ends of the wire 22 together. This type of interference with the clamping operation, and the subsequently caused ineffective twist, effectively frustrates the binding operation of the baler.

Stalks placed above the top 11 of the bale case can also directly interfere with the wire twister 30. If when the two ends of wire 22 are retained in the clamp and guard assembly 26, stalky material becomes lodged among the two ends of the wire and an effective twisting operation cannot be performed. When the stalky material is in the position described, it will become intertwined during the twisting operation with the two ends of the wire desired to be twisted. Therefore, this situation again creates the possibility that due to a loose twist, caused by stalky material wedging between the two twisted wires, the bales will break upon movement from the bale case 10.

To eliminate the above problems encountered when baling stalky material, the present invention proposes to place baffles 32, shown in FIGS. 1–3, over the needle slot openings 18 in the top 11 of the bale case in such a manner as to prevent any material in the bale case from proceeding to the tying mechanism 20. As shown in FIG. 1, two baffles 32 are placed on either side of the needle slot openings 18 at the top 11 of the bale case. These baffles are manufactured with the front end 42 formed in such a way that any material transported by needles 16, through the needle slot openings 18, will be sheared away from said needles. This shearing effect is accomplished by cutting the front portion 42 of the baffles, at approximately a 45° angle.

The mounting of the baffles above the needle slot openings 18 in the top 11 of the bale case is accomplished by the use of nuts and bolts passing through the U-shaped mounting points 34, shown in FIG. 1. This type mounting configuration allows the operator to adjustably place the baffles into various positions with respect to the needles 16. If, for example, the farmer wished to bale a material having stalks with a very small diameter, he may wish to place the baffles 32 closer to the needles 16. This adjustable type mounting 34 allows the operator to change the width of the needle slot openings 18 behind the baffles from 1½ inches to ½ of an inch. It should be noted that the closeness with which the front end of the baffle 42 approaches the needles 16 as they protrude through the needle slot openings 18, is directly related to the shearing capability of the baffles.

The present invention also provides a means by which the wire 22 on the needles 16 can be guided into the proper location within the tying mechanism 20. As shown in FIGS. 1 and 3, two baffles 32 are positioned over each needle slot opening 18 in the top 11 of the bale case. The use of two baffles provide proper positioning of the wire 22 as it passes through the openings 18. Prior to the use of the present invention, the binding material would sometimes be misaligned in the tying mechanism thereby preventing the proper operation of the tying and twisting devices.

As shown in FIGS. 1, 2 and 3, the baffles 32 also provide a means on which components of the tying mechanism 20 can be mounted. For example, in FIGS. 1 and 2, it can be seen that attached directly to the baffles 32 is the unloading roller rack 28, which acts to guide end 1 of wire 22 as it is being formed around the bale. This mounting of the unloading rack 28 on the baffles 32 allows a more efficient operation of the unloading roller rack due to the closeness with which the rack can be placed in reference to the needle slot openings 18.

Finally, baffles 32 are provided with a vertical leg 36 which projects into the bale case 10 as shown in FIG. 2. These vertical projections prevent material in the bale case 10 from being forced through the needle slot openings 18 during the compression cycle of the baling operation. These legs 36 force the stalky crop material into the bale case 10 and away from the tying mechanism 20.

Figure 5:
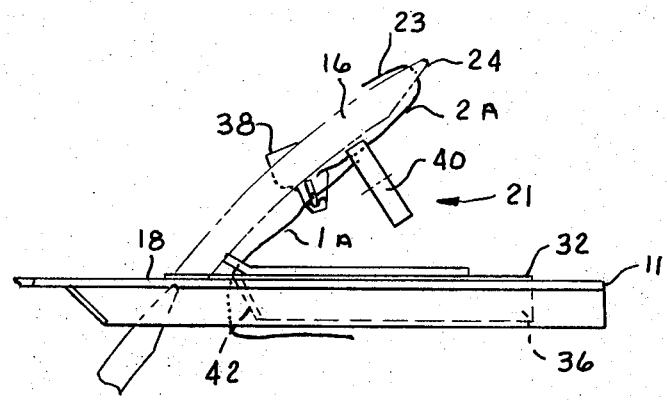
FIG. 5 is a side view of the baffles of this present invention and portions of a conventional twine tying mechanism.
Figure 6:
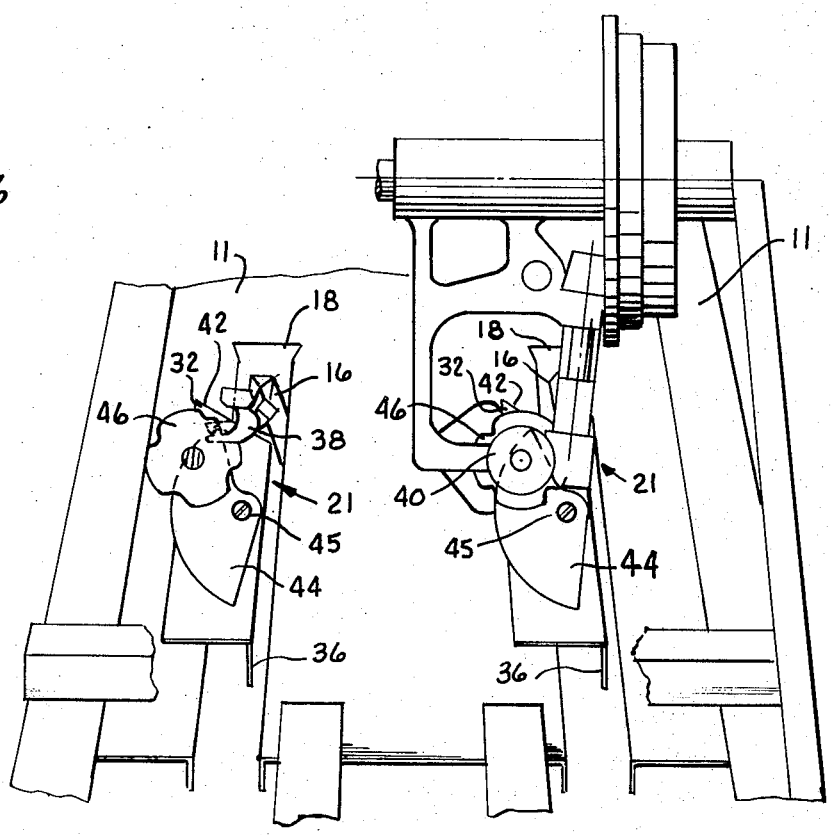
FIG. 6 is a rear perspective view of the assembly shown in FIG. 4, showing in more detail how the present invention and tying mechanisms are interconnected.
Figure 7:
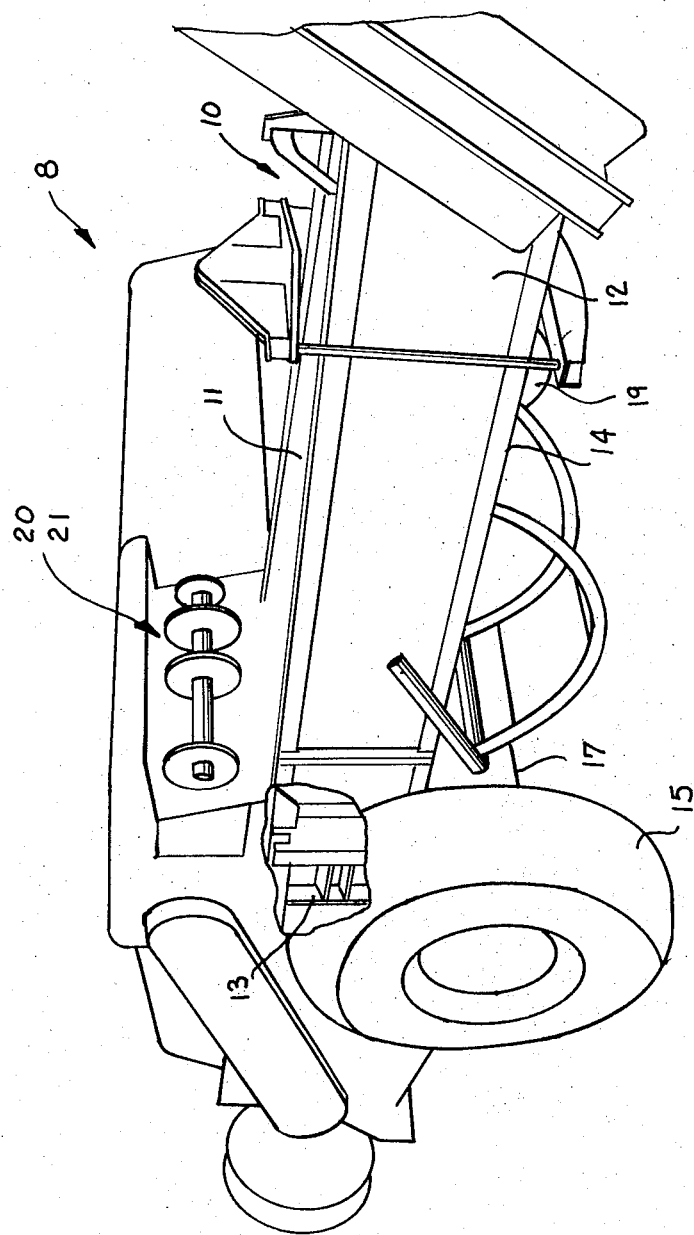
FIG. 7 is a perspective view of a baler.

The functions of the present invention described with reference to the wire tying mechanisms, are similar when applied to a twine tying device. As previously described, the general operation of a wire tie mechanism and a twine tie mechanism are very similar. In a twine tie mechanism, one end of the twine 23 is initially held in the twine disc assembly 40, while the other end passes through the tip of the needles 16 initially positioned below the floor 14 of the bale case. As with the wire tie device, the material is forced across the twine so that when the bale is formed within the chamber 10, the end 1a of the twine 23, initially held in the twine disc assembly 40, now encircles the top, rear, and bottom portions of the bale. Upon activation of the needles 16, end 2a of the twine 23 is moved along the rear of the formed bale, thereby completely encircling the bale with the twine 23. As shown in FIG. 5, needles 16 proceed to the twine disc assembly 40 after projecting through the needle slot openings 18. When the needles 16 reach the twine disc assembly 40, the end 2a of the twine 23 is placed in the twine disc 46, as seen in FIG. 6. When both the initially secured twine and the twine which was carried by the needles 16 are held in the twine disc assembly 40, the respective ends (1a, 2a) of the twine 23, pass over the bill hook 38 of the tying mechanism 21. This bill hook 38, as shown in FIGS. 5 and 6, moves in a clockwise direction to effectively tie the two ends of the twine 23 together. Once the knotting procedure is completed by the bill hook 38, a knife edge, not shown, cuts the twine thereby completing the tying operation.

As with the wire tying device, the baffles 32 of the present invention provide a means by which material is prevented from proceeding from the bale case 10 through the needle slot openings 18 to the tying mechanism 21. As with the wire tie mechanism, the baffles 32 are formed with the front edge 42 aligned at a 45° angle. This type of configuration creates a shearing effect to prevent any material transported by the needles 16, as they pass through the bale case 10, from interferring with the tying operation.

The baffles, as utilized with the twine tie mechanism 21, also have vertical legs 36, shown in FIG. 5, which project into the bale case 10 to prevent any crop material being compressed into a bale, from being forced through the needle slot openings 18 in the top of the bale case.

Figure 4:
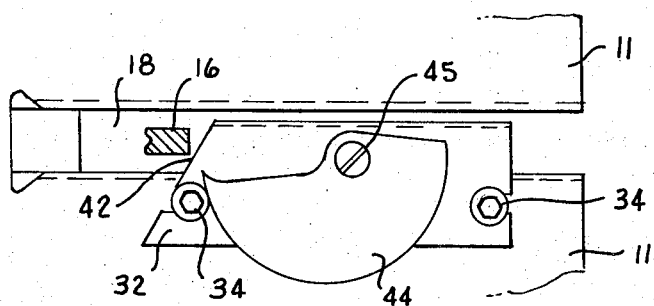
FIG. 4 is a plan view of a portion of a conventional twine tying mechanism and the baffles of this invention.

FIGS. 4 and 6 show the utilization of the baffles 32 as a means for mounting individual components of the tying mechanism 21. By mounting the twine finger 44 on the baffle 32, it allows the finger 44 to pivot at mounting point 45 so as to move in closer proximity to the twine 23 when it is retained in the twine disc assembly 40, immediately prior to the knotting procedure. The closer the twine finger 44 operates to the needle slot openings 18 in the top 11 of the bale case and the ends of the twine 23 passing over the bill hook 38, the better the knotting operation can be performed.

Finally, as shown in FIGS. 4 and 6, only one baffle 32 is used for each needle slot opening 18 in the top 11 of the bale case. The utilization of the single baffle 32 serves the identical function as did the utilization of two baffles, over the needle slot openings 18, in the wire tie mechanism. In the twine tie mechanism, it is advantageous for the needles 16, after they protrude from the bale case 10, to be aligned to the right side of the needle slot opening 18 to assure proper placement of the twine 23 in the twine and disc assembly 40. Due to the alignment function of the present invention, it is possible to manufacture bale cases for either a wire or twine tie mechanism with precisely the same type needle slot openings in the top of the bale case. This added function eliminates the necessity to manufacture separate types of bale cases for use with the respective type tying devices since the baffles 32 can be mounted to provide the proper alignment of the needles 16 in either type tying device.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

Having thus described our invention, what we claim is:

1. In a baler having a wheel supported main frame, a longitudinally extending bale case mounted on the main frame and having a platform, two side walls and a top in which are included openings, a reciprocating plunger within said bale case which operates to compress any material within the bale case, a tying mechanism mounted on said bale case above the openings and needles initially positioned below the platform of the bale case which needles when activated move through said case, and through the openings in the top of the bale case to a position in contact with the tying mechanism, the improvement comprising: a baffle assembly mounted directly above said openings for preventing any material in the bale chamber from being conveyed by the tying needles into the tying mechanism, said baffle assembly comprising at least one plate for each of said openings, the plates extending substantially over said openings so that at least one-half of said openings are covered, and means for rigidly mounting said plate directly above and substantially over said openings.

2. The invention, as described in claim 1, wherein said plate includes a shearing means for preventing material transported through the bale case by the needles from proceeding into the tying mechanism.

3. The invention, as described in claim 2, wherein said shearing means comprises a 45° angle front edge.

4. The invention, as described in claim 1, wherein said plate includes a 90° bend, commencing at the end of the 45° angle, and proceeding along the entire length of the plate, which allows the plate to protrude vertically into the bale case and which prevents material from being forced through the openings in the top member of said case during compression of the material by the reciprocating plunger.

5. The invention, as described in claim 1, wherein said mounting means comprises a generally U-shaped slot positioned at generally both the front and rear of said plate.

6. The invention, as described in claim 5, wherein said generally U-shaped slot includes a securing means for preventing movement of the steel plate during operation of the baler.

7. The invention, as described in claim 6, wherein said securing means is comprised of a nut and a bolt.

8. The invention as described in claim 1, wherein said plate is further adapted to act as a mounting platform for portions of the tying mechanism.

* * * * *